Patented Aug. 31, 1948

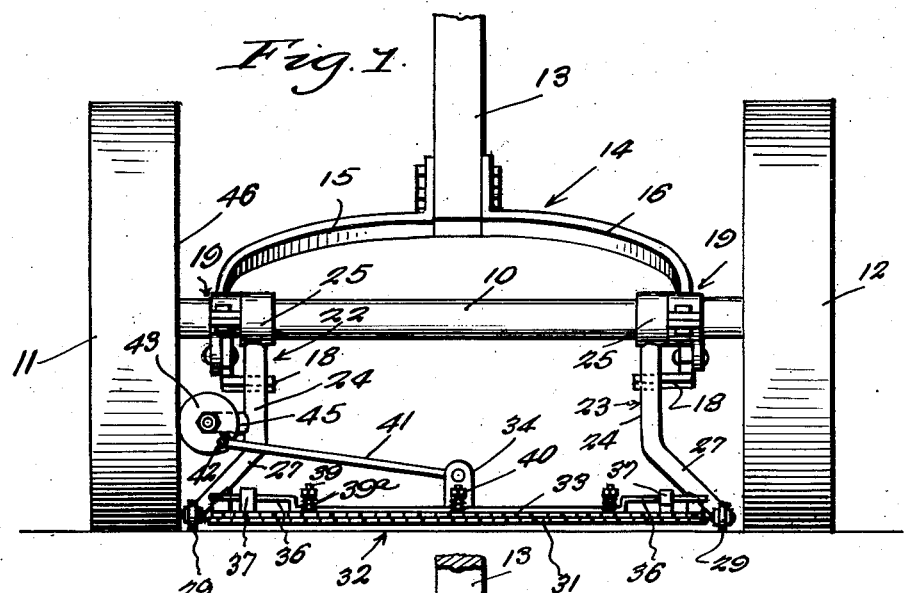

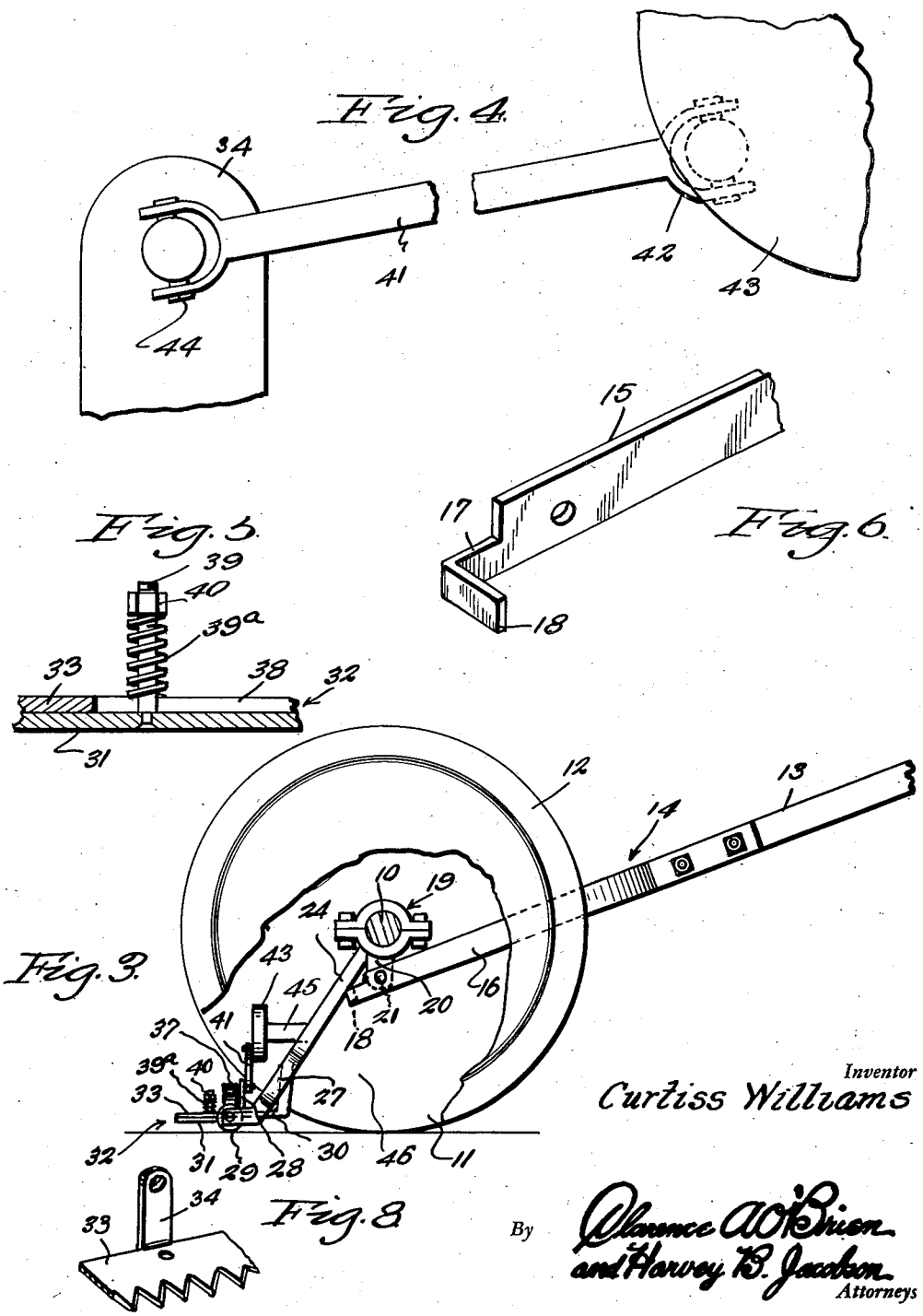

2,448,241

UNITED STATES PATENT OFFICE 2,448,241

LAWN MOWER

Curtiss Williams, Washington, D. C.

Application June 7, 1945, Serial No. 598,030

5 Claims. (Cl. 56—259)

The present invention relates to an improved lawn mower characterized by a wheel-supported axle, a somewhat regulation type handle, improved yoke means connecting the inner end of the handle with the axle, and what is believed to be a highly efficient and practical mower construction and arrangement.

More specifically, the invention is characterized by a relatively stationary cutter guard and a complemental, relatively movable, reciprocal, cutter bar cooperable with the guard, novel means being provided to coordinate and satisfactorily support these parts on the wheel-supported axle or frame.

As implied in the preceding paragraphs, I am sufficiently conversant with the state of the art to which the invention relates to full well appreciate that reciprocatory cutter means on an otherwise conventional type lawn mower is not, in itself, new. Therefore, in carrying out the structural improvements and refinements herein introduced and relied upon, I have adopted what is believed to be an adaptation of such parts calculated to better serve my aim and to generally and otherwise improve upon known types of lawn mowers in this particular category.

In carrying out the specific principles of the invention, I have evolved and produced a lawn mower which lends itself adaptable to cut high grass and which will serve to trim grass close up to the point of presence of trees, bushes, sidewalks, buildings, and the like.

Another object of the invention has to do with the simplicity of construction and arrangement of parts, and the adoption and use of such parts as lend themselves adaptable to ready assembling, in the first instance, and replacements when worn or otherwise temporally out of order.

Furthermore, a mower constructed in accordance with my idea is susceptible of easy operation, is not liable to breakage or undue wear with ordinary usage, will operate advantageously in wet grass, and will otherwise fulfill the general and specific purposes for which it is expressly designed and constructed.

Other features and advantages will become more readily apparent from the following description and the accompanying illustrative drawings.

In the drawings, wherein like numerals are employed to designate like parts throughout the views:

Figure 1 is what may be called a front elevational view of a lawn mower constructed in accordance with the principles of the present invention.

Figure 2 is a top plan view of the structure seen in Figure 1.

Figure 3 is a side view of either Figures 1 or 2 with one of the wheels broken away to expose the construction in relationship of parts existing between said wheels.

Figure 4 is an enlarged and somewhat exaggerated view of the push-pull link forming the operating connection between the power-takeoff disk and reciprocal cutter bar.

Figure 5 is a section, suitably enlarged, on the longitudinal line 5—5 of Figure 2.

Figure 6 is a fragmentary perspective view of the end portion of one of the yoke arms.

Figure 7 is a slightly enlarged detail sectional view taken on the plane of the line 7—7 of Figure 2.

Figure 8 is a fragmentary perspective view of the intermediate portion, the lug-equipped portion of the reciprocatory cutter bar.

Referring now to the drawings by distinguishing reference numerals, attention is first directed to Figures 1 and 2 in which it will be observed that the wheel-supported frame comprises an axle 10 and ground-engaging wheels 11 and 12, these of appropriate construction. The handle, which is somewhat customary, is denoted by the numeral 13 and attaches at its inner or lower end to the conventional appearing yoke 14, said yoke comprising complemental arms 15 and 16. The lower free ends of the arms are notched away as indicated at 17 in Figure 6, where they are bent laterally inward to provide lifting fingers 18. In this connection, I direct attention to sectional clamps 19 (see Figure 3) bolted on the axle adjacent the ends thereof and provided with depending suspension ears 20. The finger-equipped end portions of the arms 15 are pivotally connected, as at 21, to the ears.

The purpose of clamps 19 and the especially constructed, finger-equipped yoke arms will be made apparent from the following description.

I next call attention to a pair of duplicate, longitudinally spaced adapter brackets 22 and 23 (see Figures 1 to 3, inclusive). These brackets are each the same, and the construction of one will suffice for both. Therefore, each bracket comprises an arm 24 having a collar 25 surrounding and rockable on the axle 10 inwardly of the adjacent clamp 19. The collar is provided, if desired, with a friction-adjusting nut screw 26. As brought out in Figure 3, the major part 24 of the bracket descends and inclines forwardly and outwardly. Then the lower end portion is laterally offset as at 27, the terminal 28 being fashioned into a fork and said fork being provided with a small ground-engaging and stabilizing roller or wheel 29. The yoke carrying the wheel is sufficiently offset as to place it parallel to the ground, as shown in Figure 3. In addition, and as better brought out in Figure 7, the bracket is provided within the vicinity of the fork with a substantially right angular fitting 30 and this is riveted or otherwise permanently secured to the inner longitudinal edge portion of the toothed cutter guard 31, one of the parts of the cutter means 32 (see Figure 7). Thus, the cutter guard is suspended by the right angular portions 30 on the brackets, its ends being located inwardly of the rollers 29 and said rollers being inwardly of the mower wheels 11 and 12. The reciprocal cutter bar is indicated at 33 and is superimposed upon and movable in relation to the cutter guard 31. It is provided on its rear, inner edge with an upstanding operating lug 34. In addition, and as shown in Figure 2, it is provided with a reinforcing metal strip or strap 35 which is riveted in place and which has its outer end portion laterally offset, as at 36, to function as guides, these guides working back and forth through guide eyes 37 rigidly mounted on the outer end portions of the cutter guard 31. The outer end portions of the rear longitudinal edge of the cutter bar 33 are notched as shown at 32a in Figure 2 to provide clearance for the parts 36, 37 and 30. Also, it will be observed that the reciprocatory cutter bar is provided with longitudinal slots 38, which, as shown in Figure 5, serve to accommodate assembling studs 39 carried by the cutter guard and threaded at their upper ends to accommodate the assembling nuts 40 holding in place the cushioning springs 39a. The springs surround the studs as is shown and keep the parts 31 and 33 together in operating relationship. As before indicated, the lug 34 is the motion-transmitting element and this receives its motion from a pitman or so-called push-pull link 41 which is eccentrically connected, as at 42, to a power-takeoff disk 43. The connection is shown to the right in Figure 4, and the connection 44 at the opposite end is shown to the left, this being the special connection between the link 41 and lug 34. I found it necessary to bring out the parts in an enlarged view here, since they could not be seen on the smaller scale appearing in the other views.

The disk 43 is carried by an L-shaped member 45 mounted on the bracket 22, the periphery of said disk being in friction-driving contact with the friction surface 46 which is especially formed on the inner face of the ground-engaging wheel 11. Thus, as the wheel 11 turns, it transmits motion to the disk 43 which operates the pitman, the pitman, in turn, operating the lug 34, and the lug shifting the toothed cutter bar 33 back and forth in relation to the cutter guard 31. This provides a so-called sickle or mower cutting action.

The brackets 22 and 23, rockably mounted on the axle 10, coact with the cutter means 32 in forming a unitary frame, the frame being supported by the small rollers 29 to clear the ground, but being sufficiently close to the ground to provide the desired shearing action. The entire frame of the unit can be lifted or lowered by way of the yoke arms 15 and 16. This is accomplished by engaging the aforementioned fingers 18 beneath the adjacent hinged end portions of the brackets 22 and 23. This is brought out in Figures 1 to 3. Normally, the handle 13 is held so that the yoke 14 occupies the approximate position seen in Figure 3. When, however, it is desired to swingably lift the entire cutter frame, the brackets 22 and 23 and other parts, all that is necessary is to swing the handle down close to the ground to pivot the fingers 18 up beneath the brackets 22 and 23 to lift the brackets and the parts carried thereby. This makes it possible to swing the entire cutter means clear of objects, in an obvious manner.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. A lawn mower of the class described comprising a handle-equipped, wheel-supported axle, a pair of brackets attached at right angles to and rockably suspended from end portions of said axle, ground-engaging rollers mounted on the free, lower, outer end portions of said brackets, a horizontal cutter guard supported and mounted between the respective brackets, a toothed reciprocatory cutter bar mounted for reciprocation atop said cutter guard, said cutter guard being provided, at opposite ends, with fixedly mounted upstanding guides, said cutter bar being provided, at opposite ends, with guide elements slidably mounted in said guides, said cutter bar being provided with longitudinally-spaced, elongated slots, studs carried by and extending at right angles from said cutter guard and projecting through and beyond said slots, coiled springs surrounding said studs and engaging the cutter bar, and retaining nuts on said studs holding said springs in place.

2. A lawn mower of the class described comprising a wheel-supported frame including an axle having handle means, a pair of duplicate adapter brackets having collars rockably mounted on the end portions of said axle, said brackets being in longitudinally spaced approximate parallelism and at right angles to said axle, the lower, outer ends of said brackets being offset outwardly and laterally and terminating in forks, ground-engaging rollers mounted in the respective forks, L-shaped members attached to the lower, laterally-offset end portions of the brackets, a cutter guard horizontally disposed, the free ends of said L-shaped elements being rigidly secured to the inner edge portion of said cutter guard, guide eyes attached to and rising from said cutter guard, a cutter bar mounted for reciprocation atop said cutter guard, said cutter bar being provided, on its inner edge, with a longitudinally extending strap and an upstanding operating lug, said strap having its opposite, outer ends laterally offset to provide guide elements, and said guide elements being slidable through said guide eyes.

3. A lawn mower of the class described comprising a wheel-supported axle having handle means, a pair of duplicate adapter brackets having collars rockably mounted on the end portions of said axle, said brackets being in longitudinally spaced approximate parallelism, the lower, outer ends of said brackets being offset outwardly and laterally and terminating in forks, ground-engaging rollers mounted in the respective forks, L-shaped members attached to the lower, laterally-offset end portions of the brackets, a cutter guard horizontally disposed, the free ends of said L-shaped elements being rigidly secured to the inner edge portion of said cutter guard, guide eyes attached to and rising from said cutter guard, a cutter bar mounted for reciprocation atop said cutter guard, said cutter bar being provided, on its inner edge, with a longitudinally extending strap and an upstanding operating lug, said strap having its opposite, outer ends laterally offset to provide guide elements, and said guide elements being slidable through said guide eyes, together with a right angularly shaped fixture carried by one of said brackets, a friction-driving disk mounted for rotation on said fixture, and a push-pull link pivotally connected with said disk at one end and pivotally connected at its opposite end with said lug.

4. In a lawn mower, a frame including an axle, ground contacting wheels mounted on the end portions of said axle, one of said wheels having its inner face provided with a smooth friction disk tracking and driving surface, a relatively small power take-off and motion transferring friction disk disposed at approximate right angles to said driving surface and having its peripheral surface in direct contact with said surface, means for supporting said disk from said frame including a portion at right angles to said axle, a pitman eccentrically and pivotally connected at one end to said disk, and reciprocable bar means supported parallel to said axle, the remaining end of said pitman being connected to said bar means, whereby the latter is driven from said ground wheel, this by way of said friction disk.

5. In a lawn mower construction of the class described, a mobile frame including an axle, ground contacting wheels mounted on the end portions of said axle, one of said wheels having a friction surfaced inner face, said face being adapted to drive and impart rotary motion to a coacting friction disk, a power take-off and motion-transferring friction disk, said friction disk being disposed at approximate right angles to said one ground contacting wheel and driving face thereof, a pair of bracket arms, said arms being longitudinally spaced and rockably mounted on end portions of said axle, said bracket arms depending outwardly and downwardly at points inwardly of said ground contacting wheels, bar means mounted on the outer ends of said bracket arms, an operating connection between said friction disk and bar means, one of said bracket arms being provided with an integral part, said part including a portion at right angles to the axle, and said friction disk being mounted for idling rotation on said portion.

CURTISS WILLIAMS.

REFERENCES CITED

The following references are of record in the file of this patent:

UNITED STATES PATENTS

| Number | Name | Date |
|---|---|---|
| 700,173 | Cliffton | May 20, 1902 |
| 746,475 | Duckett | Dec. 8, 1903 |
| 1,026,204 | Edmunds | May 14, 1912 |
| 1,913,721 | Pavelko | June 13, 1933 |